(12) United States Patent
Smit et al.

(10) Patent No.: US 10,527,201 B2
(45) Date of Patent: Jan. 7, 2020

(54) CABLE ANCHOR

(71) Applicant: SIGNIFY HOLDING B.V., Eindhoven (NL)

(72) Inventors: Maarten Alexander Smit, Eindhoven (NL); Gerrit Jan Hillen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/385,916

(22) Filed: Apr. 16, 2019

(65) Prior Publication Data

US 2019/0242498 A1 Aug. 8, 2019

Related U.S. Application Data

(62) Division of application No. 15/559,160, filed as application No. PCT/EP2016/055527 on Mar. 15, 2016, now Pat. No. 10,295,085.

(30) Foreign Application Priority Data

Mar. 20, 2015 (EP) .................................... 15160027

(51) Int. Cl.
| | |
|---|---|
| *F16L 3/00* | (2006.01) |
| *F16L 3/10* | (2006.01) |
| *F16L 3/12* | (2006.01) |
| *F16L 3/223* | (2006.01) |
| *H02G 3/32* | (2006.01) |

(52) U.S. Cl.
CPC ............ *F16L 3/1091* (2013.01); *F16L 3/1207* (2013.01); *F16L 3/2235* (2013.01); *H02G 3/32* (2013.01)

(58) Field of Classification Search
CPC ........ H02G 3/30; H02G 3/263; H02G 3/0437; F16L 3/1075
USPC .............................. 248/73, 74.1, 71, 65, 68.1
See application file for complete search history.

(56) References Cited

U.S. PATENT DOCUMENTS

| | | | |
|---|---|---|---|
| 2,937,835 A | 5/1960 | Csmereka | |
| 3,531,071 A | 9/1970 | Kubli | |
| 3,989,210 A | 11/1976 | Berkman et al. | |
| 4,395,009 A | 7/1983 | Bormke | |
| 6,378,813 B1 | 4/2002 | Gretz | |
| 8,602,365 B2 * | 12/2013 | Neace | H02G 3/32 248/215 |
| 9,038,968 B2 | 5/2015 | Hennon | |
| 9,252,581 B2 * | 2/2016 | Stechmann | H02G 3/32 |
| 9,577,417 B2 * | 2/2017 | Stechmann | H02G 3/32 |
| 9,605,773 B1 | 3/2017 | Tarapchak | |
| 9,732,884 B1 | 8/2017 | Keller | |
| 2006/0249636 A1 | 11/2006 | Thiedig | |

(Continued)

FOREIGN PATENT DOCUMENTS

| | | |
|---|---|---|
| CH | 700182 B1 | 7/2010 |
| EP | 1388699 A1 | 2/2004 |
| GB | 2335725 | 9/1999 |

*Primary Examiner* — Steven M Marsh
(74) *Attorney, Agent, or Firm* — Daniel J. Piotrowski (57) ABSTRACT

Proposed is a cable anchor for mounting a cable to a sheet. The cable anchor includes a first clamp portion to be mounted on a first side of the sheet and a second clamp portion to be mounted on the second side of the sheet, opposite to the first side. The first clamp portion and second clamp portion co-operate to retain a cable.

12 Claims, 4 Drawing Sheets

(56) References Cited

U.S. PATENT DOCUMENTS

2014/0097304 A1 4/2014 Mastro
2014/0291456 A1* 10/2014 Rego .................... F16L 3/1211
　　　　　　　　　　　　　　　　　　　　　　　248/69

* cited by examiner

CABLE ANCHOR

FIELD OF THE INVENTION

This invention relates to the field of cable anchors.

BACKGROUND OF THE INVENTION

A cable anchor may be used for securing and supporting a cable, such as an electrical cable, in a fixed position.

Cable anchors may be designed in particular to provide strain relief, in order that forces applied to the cable on one side of the cable anchor are not transmitted past the cable anchor but are instead borne by the cable anchor and in turn a component such as a board or connector to which the cable anchor is mounted. This increases resistance to forces on the cable and hence improve the mechanical and electrical integrity of the assembly. Such forces may occur during manufacturing, for example when components are connected together or due to accidental movement of the cable. After assembly, the cable may be subject to linear or rotational forces due to movement or pulling of the cable. If the forces applied to the cable on one side of the cable anchor are transferred to the part of the cable on the other side of the cable anchor, such forces may cause disconnection of the cable or damage to the component to which the cable is attached.

It is important that the strain relief is effective, since this will have a significant effect on overall performance. Additionally, effective strain relief can significantly enhance the lifetime of a device.

A cable anchor must therefore be able to withstand the forces it is subjected to, in order to protect the connection. Further, the cable anchor will be mounted to another component such as a board or sheet and it is important to avoid deformation of the cable anchor or of the sheet it is mounted to due to stress. High levels of stress are particularly likely to occur where a cable is large, or subject to rotational forces.

U.S. Pat. No. 3,989,210 describes a cable anchor that is in the form of a clip that clips to through holes in a circuit board and holds cable between the cable anchor and the board. The cable anchor adapts to a variety of different thicknesses of cable. However, the cable anchor is adapted in particular to flat ribbon cables, not a variety of cables. Therefore, this solution is not of general applicability.

SUMMARY OF THE INVENTION

The invention is defined by the claims.

According to a first aspect of the invention there is provided a device as claimed in the independent claim.

In one aspect, the invention provides a cable anchor, for attaching a cable to a sheet, comprising: a first clamp portion having a first mounting surface for mounting the first clamp portion to a first side of the sheet, the first clamp portion having a first cable receiving portion recessed into the first mounting surface; a second clamp portion having a second mounting surface for mounting the second clamp portion to a second side of the sheet opposite to the first side of the sheet, the second clamp portion having a second cable receiving portion which protrudes in an outward direction from the second mounting surface for projecting through an aperture in the sheet to co-operate with the first cable receiving portion thereby securing the cable between the first clamp portion and the second clamp portion and sandwiching the cable and the sheet between the first clamp portion and the second clamp portion.

By providing a cable anchor which engages with the sheet on both sides of the sheet, with the first mounting surface of the first clamp portion engaging with one side of the sheet and the second mounting surface engaging with the other side of the sheet, any force applied to the cable will be taken by the cable anchor and borne by the sheet. In this way, forces on the cable may be applied in a variety of directions without malfunction of the strain relief or deformation of parts of the strain relief. The sheet will distribute the forces applied to the strain relief without allowing an accumulation of forces in the area of the interface between the strain relief and the sheet.

The cable may be held spaced from the sheet by the second cable receiving portion and held on the first side of the sheet between the first cable receiving portion and the second cable receiving portion. This sandwiching of the cable and the sheet between the first cable receiving section and the second cable receiving section will reduce the accumulation of stresses in the interface area of the sheet and the strain relief. The cable does not have to be in contact with the sheet, it may be spaced away from the sheet by the second cable receiving portion. When in use, the cable and the sheet are between the first clamp portion and the second clamp portion, the first clamp portion may be tightened using fixings located between the first clamp portion and the second clamp portion. The first clamp portion will be tightened towards the second clamp portion thus sandwiching the cable between the first cable receiving portion and the sheet or alternatively between the first cable receiving portion and the second cable receiving portion. The second mounting surface will act upon the reverse of the sheet thus opposing the force applied by the fixings and the first clamp portion. This means that the cable and the sheet are secured effectively between the first clamp portion and the second clamp portion irrespective of whether the cable is secured by the combination of the first cable receiving portion and the second cable receiving portion or the combination of the first cable receiving portion and the sheet. Compared with a cable anchor only on one side of the sheet, the cable anchor may present a reduced height on the first side of the sheet since only the first portion of the cable anchor and the second cable receiving portion are situated on the first side of the sheet.

In use, the first clamp portion may be mounted to the first side of the sheet and the second clamp portion may be mounted to the second side of the sheet. The first and second mounting surfaces may interface with the sheet to provide a large contact area. This may minimize the stress that the cable anchor and sheet are subjected to as a result of forces transmitted through the cable. The effective strain relief provided by the cable anchor means that the cable anchor is capable of supporting large, heavy cables. In addition, the cable anchor can handle rotational forces.

The second mounting surface may extend around and surround the second cable receiving portion. The surface area of the mounting surfaces may be relatively large. Thus, the area of the second cable mounting surface may be at least 20%, preferably 30% and further preferably 50%, of the cross-sectional area of the cable anchor projected in the mounting plane. The area of the first cable mounting surface may likewise extend for at least 20%, preferably 30% and further preferably 50%, of the cross-sectional area of the cable anchor projected in the mounting plane.

The cable anchor may comprise at least one fixing member for securing the first and second clamp portions to each other in a fixed position. In use, the at least one fixing member may pass through fixing apertures in the sheet. This may ensure that the cable is securely retained by the cable anchor.

The fixing member(s) may allow for a variety of sizes of cable, and allow the first clamp portion and second clamp portion to be fixed with a variety of different spacings between the first and second cable receiving portions.

The first clamp portion may extend longitudinally with a screw hole on either end of the first clamp portion; the second clamp portion may extend longitudinally with a corresponding screw hole on either end of the second clamp portion; and the at least one fixing member may comprise a first screw extending from the screw hole at one end of the first clamp portion into the corresponding screw hole of the second clamp portion and a second screw extending from the screw hole at the other end of the first clamp portion into the corresponding screw hole at the other end of the second clamp portion for fixing the first clamp portion to the second clamp portion.

The screws can be adjusted to allow for different cable cross-sections.

The cable anchor may comprise at least one mounting member protruding from the mounting surface for attaching the second clamp portion to the sheet. By providing a mounting member to fix the second clamp portion to the sheet, the second clamp portion may be fixed in place before mounting the cable to assist assembly of the cable anchor and cable.

The mounting member may be of flexible material and may be adapted to extend through a mount aperture in the sheet to secure the clamp portion to the sheet. This may ensure that the attachment process of the cable anchor is quick and easy to perform—the second clamp portion may be fitted and held in place so that it does not need to be supported while the cable is introduced nor the first clamp portion.

Each mounting member may be a press fit mounting member adapted to be attached to a corresponding aperture in the sheet. The distal end of the mounting member may be displaced when the mounting member is passed through the mount aperture and my return to its original alignment once the distal end and perhaps a further portion of the mounting member has passed through the mount aperture. This may be a hook wherein once the distal end of the mounting member has passed through the mount aperture the mounting member returns to its original alignment and the point of the hook returns to the original gap between the point and the shank of the hook thus securing the mounting member and in turn the second clamp portion to the sheet.

The first clamp portion may consist of a single piece of plastic and the second clamp portion may consist of a single sheet of plastic. This may allow for simple, efficient and cost effective manufacturing.

Alternatively, the cable anchor may have an insulating lining of insulating material for providing a fixed insulative layer between the cable anchor and the cable. This may prevent an insulation fault on the cable from making any metal parts of the cable anchor from becoming live.

The first cable receiving portion may be a recess in the first clamp portion. This may provide a reduced height of the first clamp portion in contrast to a first cable receiving portion protruding from the first mounting surface, and thus reduce the overall size of the cable anchor.

The second cable receiving portion may comprise at least one bar extending longitudinally for holding the cable. At least one bar may also engage with the aperture in the sheet.

The at least one bar may comprise a cable receiving seat in the form of a recess for receiving the cable, the cable receiving seat corresponding to the first cable receiving portion such that the first and second cable receiving portions co-operate to retain the cable. The first and second cable receiving portions may be shaped to provide a cross section which corresponds to the cross section of the cable, in order to increase the stability of the fastening. In an embodiment, the first cable receiving portion and the cable receiving seat in the second cable receiving portions co-operate to define a round cross section.

The first and second cable receiving portions may further comprise grip elements for securing the cable. This may facilitate easy installation of the cable anchor since the grip reduces movement of the cable when placed on the second cable receiving portion. The grip may also increase the stability of the connection in the fixed position since it may prevent the cable from moving. The grip elements may comprise teeth.

Alternatively or additionally, in a case where a plurality of bars form one of the cable receiving portions, one or more bars may have the cable receiving seat and hence be adapted to locate the cable in the longitudinal direction and another one or more bars may be adapted without the cable receiving seat to act as a grip.

In another aspect of the invention, there is provided a method for attaching a cable to a sheet using the cable anchor, comprising:

attaching the second clamp portion to the sheet;

positioning the cable in the second cable receiving portion;

positioning the first clamp portion with the first cable receiving portion over the cable so that the cable is between the first and second cable receiving portions and the first and second cable receiving portions co-operate to retain the cable.

The step of attaching the second clamp portion to the sheet may comprise securing the second clamp portion to the sheet with the mounting members.

The method may comprise, securing the first and second clamping portions to each other with the at least one fixing member.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

Figure 1:
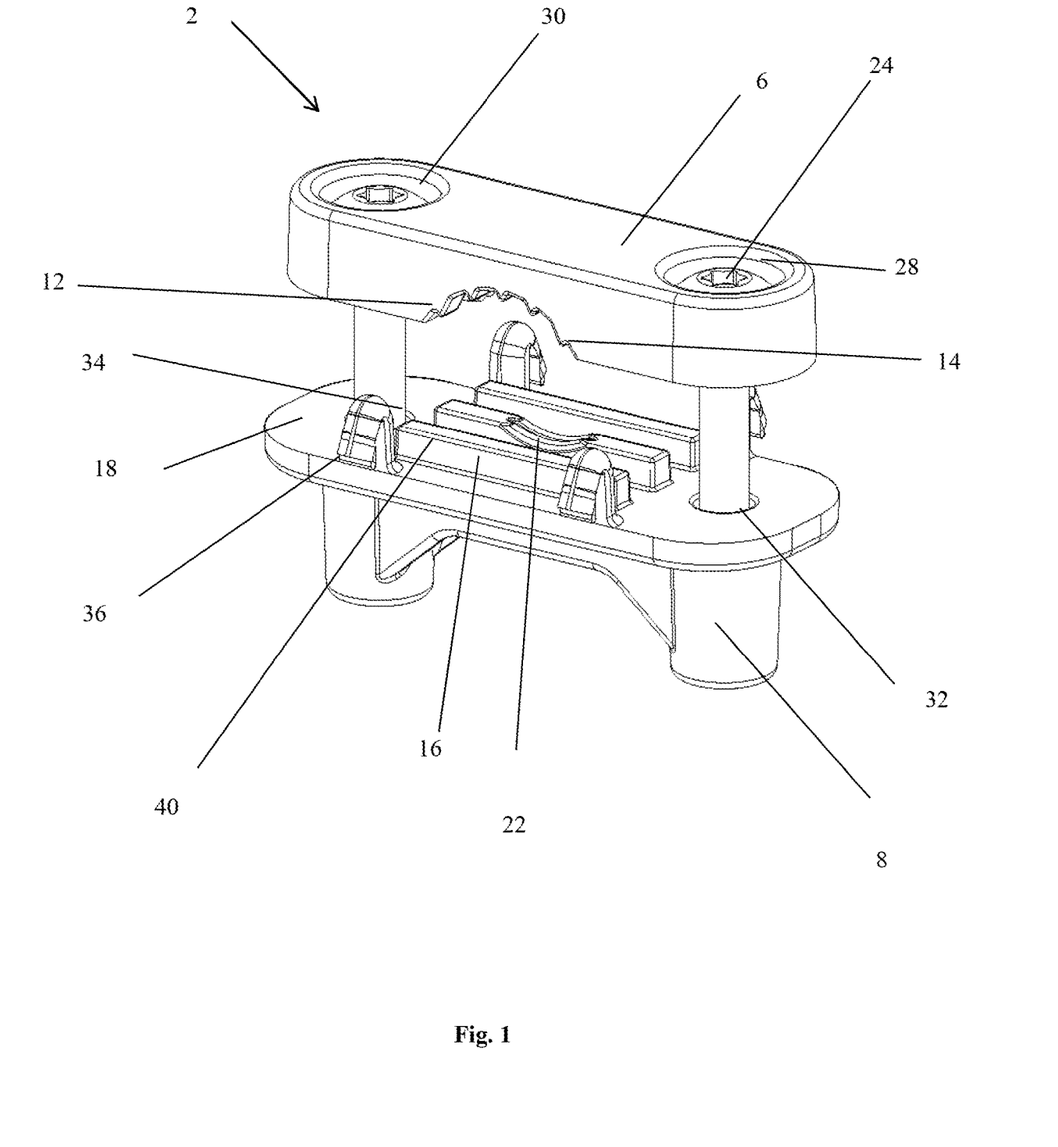
FIG. 1 illustrates a cable anchor according to the invention
Figure 2:
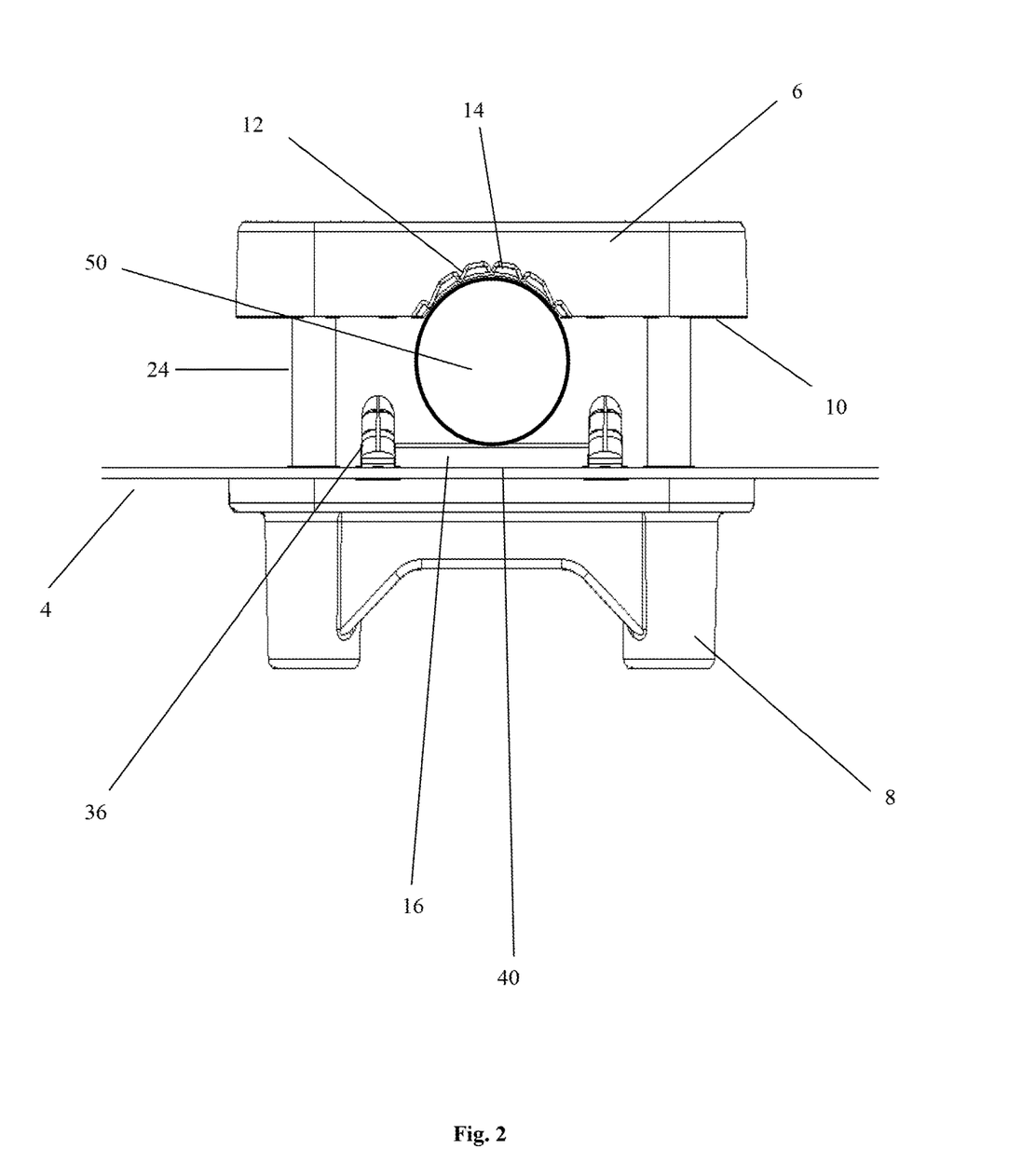
FIG. 2 shows a cross section of the cable anchor of FIG. 1; in use
Figure 3:
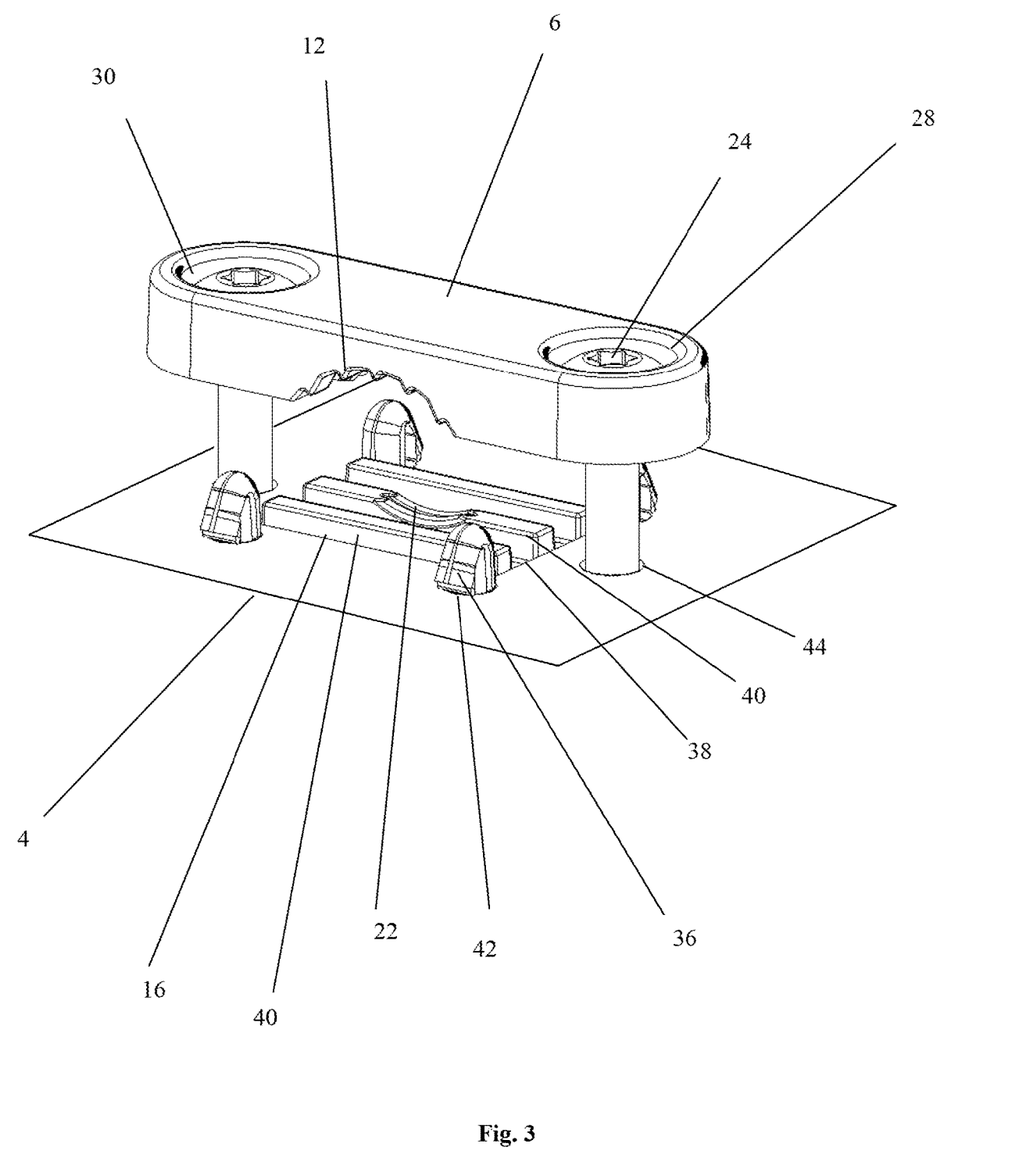
FIG. 3 shows a perspective view of the cable anchor of FIG. 1, mounted on a sheet.

A first embodiment of the invention illustrated in FIG. 1 provides a cable anchor 2 for securing a cable. In particular the cable anchor is suitable to be mounted to a sheet of material 4 as illustrated in FIGS. 2 and 3.

The cable anchor 2 comprises a first clamp portion 6 and a second clamp portion 8. The first clamp portion 6 extends longitudinally and has a first planar mounting surface 10 defining a mounting plane and a first cable receiving portion 12, recessed from the mounting plane of the first planar mounting surface. The first cable receiving portion 12 is provided with teeth 14 acting as grip elements 14 to hold the cable.

The second clamp portion 8 has a second planar mounting surface 18 extending parallel to the mounting plane and a second cable receiving portion 16, in this case protruding from the second planar mounting surface 18. The second cable receiving portion 16 includes a plurality of bars 40 extending longitudinally. One of these bars 40 has a recess acting as cable seat 22 to locate the cable. The other bars 40 do not have a recess—these bars act to grip the cable. The recess extends back towards the second planar mounting surface but is spaced from the second planar mounting surface so that, when the first and second clamp portions are put together, the recess does not extend back as far as the mounting plane of the first planar mounting surface so that the cable is spaced from the sheet 4.

The first and second clamp portions may be fixed together by fixing members, in this case screws 24.

The first clamp portion 6 has screw holes 28,30 at the longitudinal ends of the first clamp portion, i.e. on either end of the recess acting as first cable receiving portion 12. Similarly, the second clamp portion 8 has screw holes 32,34 at the longitudinal ends of the second clamp portion, i.e. on either side of the second cable receiving portion 16, at the same spacing. The screw holes 32,34 allow that screws 24 may be used to fix the first and second clamp portions 6,8 together at a spacing that may be varied to accommodate cables of different cross section or shape. In the embodiment described, the screws 24 are self-threading and the screw holes 32,34 are not threaded.

The second clamp portion 8 further has mounting members 36 also projecting from the second mounting surface 18. These are located around the second cable receiving portion but longitudinally between the screw holes 32, 34.

In use, the first and second clamp portions 6, 8 are mounted to opposite sides of the sheet 4 engaging with the sheet with first and second mounting surfaces respectively. The first and second clamp portions co-operate to retain a cable 50 (FIG. 2) when the cable anchor is mounted to the sheet.

To mount a cable to the first side of the sheet, which in this embodiment may be referred to as a front side, the second clamp portion 8 is mounted to a second side of the sheet, which may in this embodiment be referred to as a rear side, with the second mounting surface 18 engaging with the sheet across substantially the whole area of the second mounting surface and with the second cable receiving portion 16 protruding from the second mounting surface through the aperture 38 in the sheet to the first side of the sheet. The second cable receiving portion 16 is sized to fit in the aperture 38 so that the aperture locates the second cable receiving portion 16 and hence the cable anchor when mounted to the sheet 4.

A cable 50 is then mounted on the second cable receiving portion 16. The first clamp portion 6 is then fixed in place on the first, front, side of the sheet with the cable between the first and second cable receiving portions using screws 24. The screws 24 allow that the gap between the first and second cable receiving portions may vary when using different cables to allow the cable anchor to be used for cable of different cross-sections.

Thus, the cable receiving portions 12, 16 are both located on the first side of the sheet when the cable anchor is mounted to the sheet and co-operate to secure the cable. In this way, the cable anchor may provide secure fastening of the cable on the first side of the sheet with the cable spaced away from the sheet, to avoid risk of electrical connection between cable and sheet. This cable anchor reduces the size of the cable anchor on the first side of the sheet compared to a cable anchor with all components on the first side of the sheet.

The first and second cable mounting surfaces are substantially planar to better engage with the planar sheet or board. The area of the cable anchor which interfaces with the sheet of material should be large enough to spread the load caused by forces on the cable being borne by the cable anchor so that the cable anchor is less susceptible to deformation and damage. The cable anchor may thus be able to resist relatively large forces without damage since it is securely mounted over a large area. Further, the large area allows for good resistance to forces applied in any direction.

Thus, the area of the second cable mounting surface is at least 20%, preferably 30% and further preferably 50%, of the cross-sectional area of the cable anchor projected in the mounting plane. The area of the first cable mounting surface may likewise extend for at least 20%, preferably 30% and further preferably 50%, of the cross-sectional area of the cable anchor projected in the mounting plane.

Each of the first clamp portion 6 and the second clamp portion 8 are of insulating material. In the example, the first and second clamp portions 6, 8 are each integrally formed from plastic, as a unitary part.

The bars 40 are shaped to interlock with the aperture 38 in the sheet 4 and hence locate the second clamp portion 8 with precision.

The cable seat 22 is recessed from the central bar such that the cable, which extends in a lateral direction, is located by this cable seat 22. The bars situated on either side of the central bar provide grip for securely retaining the cable, as well as locating the second cable mounting portion 8.

The combination of bars 40, seat 22 and teeth 14 act to hold the cable to prevent both rotational and longitudinal motion. The combination of bars and seat shapes also lifts the cable from the sharp edges of the aperture 38 in sheet 40. This assists in meeting electrical norms for high voltage wiring.

The outer surface of the first clamp portion 6, opposite the mounting surface, is recessed around the screw holes 28,30 to complement the shape of a screw and to accept the head of the screw. Screws are inserted into screw holes 28 and 30, and received by screw holes 32 and 34 which are located at the longitudinal ends of the second clamp portion 8, and correspond to screw holes 28 and 30. Screw holes 32 and 34 permit effective fastening of the first and second clamp portions 6, 8. In this way, the first and second clamp portions 6, 8 can be fastened together in a fixed position, so that the cable, which extends in a lateral direction, is securely retained by the cable anchor 2. The fixed position can be adjusted by tightening or loosening the screws to decrease or increase the separation between the first clamp portion 6 and second clamp portion 8. In this way, cables of a variety of sizes can be accommodated and securely held in place by the cable anchor 2.

The mounting members 36 are provided for mounting the second clamp portion 8 to the sheet. The mounting members 36 are arranged to protrude from the mounting surface of the second clamp portion 18 in an outward direction. The mounting members 36 are arranged between the second cable receiving portion 16 and the edge of mounting surface 18. In use, the mounting members 36 are inserted through mount apertures in the sheet 4 to secure the second clamp portion 8 to the sheet 4. In order to enable easy mounting of the second clamp portion to the sheet 4, the mounting members 36 are of flexible material which operate as a press fit in the mount apertures 42. This allows the second clamp portion 8 to be held in the correct location during assembly.

By incorporation of the mounting members in the component itself rather than the use of glue or tape cost and labor during manufacturing is reduced.

In the embodiment of FIGS. 1 to 3, the second cable receiving portion 16 is situated in the center of the second mounting surface 18, and the mounting members 36 are positioned around the perimeter of the second cable receiving portion 16. There are four mounting members 36 which are situated at the corners of the second cable receiving portion 16, which is rectangular.

FIG. 2 shows the cable anchor 2 in a side view, and FIG. 3 in perspective view. FIG. 2 shows also cable 50 which has been omitted from FIG. 3 for clarity. To illustrate the cable anchor 2 in use, the sheet 4 to which the cable anchor 2 is mounted is also shown. The first and second mounting surfaces 10, 18 interface with the sheet 4 to provide an increased contact area between the sheet 4 and the cable anchor 2. When the cable is subjected to external forces, the force is distributed through the mounting surfaces to the sheet of material since the mounting surfaces 10, 18 provide a large contact area. This minimizes stress to avoid deformation of the cable anchor 2 or sheet 4.

The first cable receiving portion 12 is a recess in the first clamp portion 6 and in this embodiment has an arcuate cross section, to complement the shape of the cable.

Since only the second cable receiving portion 16 of the second clamp portion 8 is located on the first side of the sheet, the height of the cable anchor on the first side of the sheet is reduced compared to a cable anchor mounted on the first side of the sheet.

Figure 4:
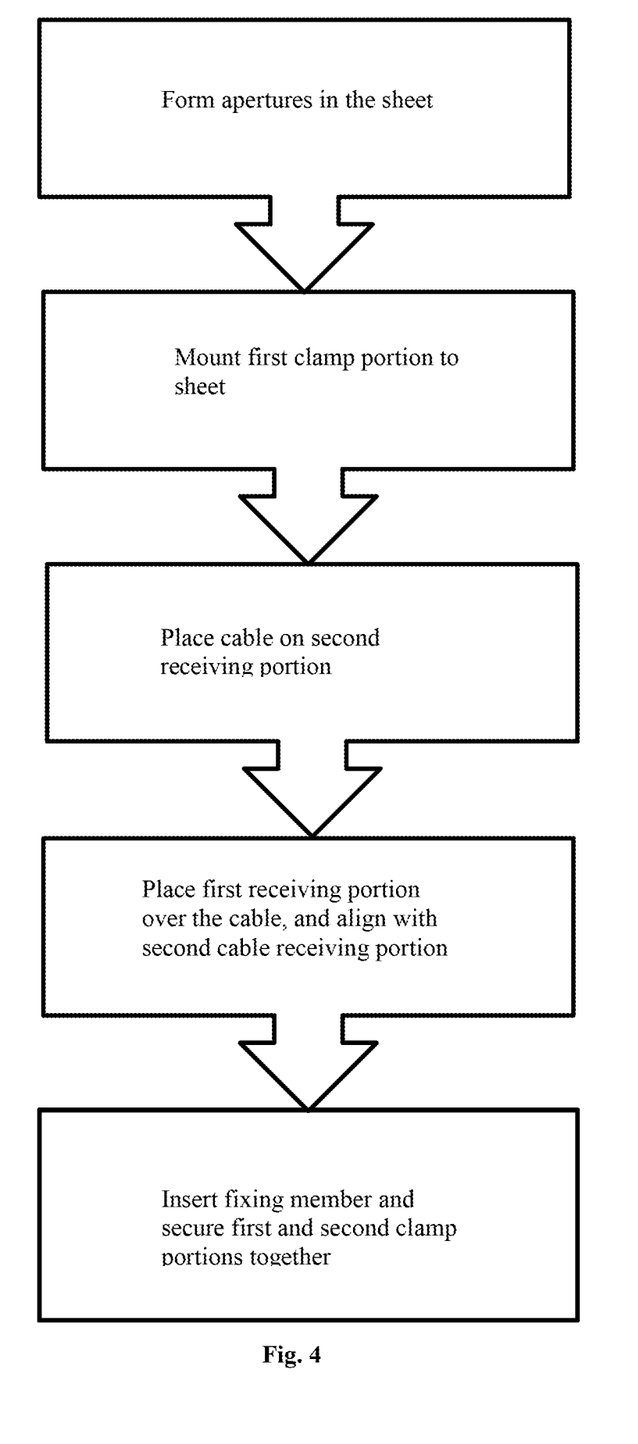
FIG. 4 is a flow diagram which illustrates a method of mounting the cable anchor of FIG. 1.

The method of mounting the cable anchor may be summarized in the flow chart of FIG. 4. Initially, an aperture 38 for accepting the second cable receiving portion and apertures 42 for accepting the mounting members and apertures 44 through which screws 24 may pass are formed in the sheet. The apertures are formed to complement the shape of the second cable receiving portion, mounting members and fixing member.

The second clamp portion 8 is mounted to the sheet 4 by mounting members 36. The mounting members 36 are inserted into mount apertures in the sheet 4. Once the second mounting surface 18 is positioned to interface with the sheet, the mounting members are fixed to the sheet 4, such that the second clamp portion 8 is securely mounted to the sheet 4. Next, the cable is placed on the second cable receiving portion, which projects through an aperture in the sheet 4 from the first side of the sheet to the second side of the sheet. The cable is held in place by the cable seat 22. The first clamp portion 6 is then placed over the cable, in alignment with the second clamp portion 8, such that the cable is positioned between the first and second cable receiving portions 12, 16. Finally, the first and second clamp portions 6, 8 are secured to each other by the fixing member 24.

By using screws, it is possible to tighten the cable with a high force to ensure it is clamped in place.

Those skilled in the art will appreciate that the above description is by way of example only, and many alternatives are possible.

In order to provide a better grip to the cable and/or improved insulation, some parts of the cable anchor may be of a different material to other parts, for example a plastic that is more resilient than the material used to form the mounting surfaces 10, 18.

The sheet 4 may typically be made of metal but other materials are also possible.

It will be appreciated that mounting surface of the cable anchor is not limited in shape and may take a different shape to that shown in the figures, for example the mounting surface may be circular.

The screw holes may be threaded.

The cable receiving portions may co-operate to define a cross section of any shape, for example the cross section may be substantially semi-circular, circular or rectangular cross section. The cable receiving portion may in particular be adapted to the size and shape of the intended cable—for example, where it is intended to clamp a flat cable, the cable receiving portions may be flat but where it is intended to clamp a round cable, the cable receiving portions may be rounded recesses.

The sheet may be pre-provided with apertures, including the aperture, mount apertures and fix apertures.

The invention claimed is:

1. A method for attaching a cable to a sheet, comprising:
   mounting a second clamp portion to a first side of a sheet, so that a second cable receiving portion protrudes through the sheet to receive the cable at a second side of the sheet opposite to the first side;
   positioning the cable in the second cable receiving portion; and
   positioning the first clamp portion with the first cable receiving portion over the cable so that the cable is between the first and second cable receiving portions thus sandwiching the cable and the sheet between the first and second clamp portions;
   securing the first and second clamping portions to each other so that the first and second cable receiving portions co-operate to retain the cable; and
   wherein the step of attaching the second clamp portion to the sheet comprises aligning at least one laterally extending bar of the second cable receiving portion with an aperture in the sheet.

2. The method of claim 1, wherein the step of positioning the cable in the second cable receiving portion comprises aligning the cable with a cable receiving seat formed in the at least one laterally extending bar of second cable receiving portion.

3. The method of claim 1, wherein the step of securing the first and second clamping portions to each other so that the first and second cable receiving portions co-operate to retain the cable comprises gripping the cable with at least one grip element formed in at least one of the first and second cable receiving elements.

4. A cable anchor, for use with the method of claim 1, comprising:

a first clamp portion having a first mounting surface for mounting the first clamp portion to a first side of the sheet, the first clamp portion having a first cable receiving portion recessed into the first mounting surface; and a second clamp portion having a second mounting surface for mounting the second clamp portion to a second side of the sheet opposite to the first side of the sheet, the second mounting surface having at least one mounting member protruding therefrom for attaching the second clamp portion to the sheet, the second clamp portion having a second cable receiving portion which protrudes from the second mounting surface for projecting through an aperture in the sheet to co-operate with the first cable receiving portion thereby securing the cable between the first clamp portion and the second clamp portion and sandwiching the cable and the sheet between the first clamp portion and the second clamp portion.

5. A cable anchor according to claim 2 wherein the second mounting surface is a planar mounting surface surrounding the second cable receiving portion.

6. The cable anchor of claim 2 further comprising at least one fixing member for securing the first and second clamp portions to each other in a fixed position.

7. The cable anchor of claim 4, wherein:

the first clamp portion extends longitudinally with a screw hole on either end of the first clamp portion;

the second clamp portion extends longitudinally with a corresponding screw hole on either end of the second clamp portion; and the at least one fixing member comprises a first screw extending from the screw hole at one end of the first clamp portion into the corresponding screw hole of the second clamp portion and a second screw extending from the screw hole at the other end of the first clamp portion into the corresponding screw hole at the other end of the second clamp portion for fixing the first clamp portion to the second clamp portion.

8. The cable anchor of claim 2, wherein the at least one mounting member is a press fit mounting member for engagement with a corresponding aperture in the sheet.

9. The cable anchor of claim 2 further comprising an insulating lining of insulating material for providing a fixed insulative layer between the cable anchor and the cable.

10. The cable anchor of claim 2, wherein the second cable receiving portion comprises a plurality of bars extending longitudinally for holding a cable extending laterally.

11. The cable anchor of claim 8, wherein at least one bar of the plurality of bars comprises a cable receiving seat in the form of a recess for receiving the cable, the cable receiving seat corresponding to the first cable receiving portion such that the first and second cable receiving portion co-operate to retain the cable.

12. The cable anchor of claim 2, wherein at least one of the first and second cable receiving portions further comprise grip elements for securing the cable.

* * * * *